(12) United States Patent
Kim et al.

(10) Patent No.: US 9,365,121 B2
(45) Date of Patent: Jun. 14, 2016

(54) METHOD AND SYSTEM FOR CONTROLLING CHARGE AND DISCHARGE OF BATTERY

(71) Applicant: Hyundai Motor Company, Seoul (KR)

(72) Inventors: Jinwook Kim, Gyeonggi-do (KR); Suk Hyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 122 days.

(21) Appl. No.: 14/264,563

(22) Filed: Apr. 29, 2014

(65) Prior Publication Data

US 2015/0165916 A1 Jun. 18, 2015

(30) Foreign Application Priority Data

Dec. 12, 2013 (KR) .......................... 10-2013-0154962

(51) Int. Cl.
*H02J 7/00* (2006.01)
*B60L 11/18* (2006.01)
*H02J 7/14* (2006.01)

(52) U.S. Cl.
CPC .......... *B60L 11/1809* (2013.01); *B60L 11/1861* (2013.01); *H02J 7/1446* (2013.01); *H02J 2007/005* (2013.01); *Y02T 10/7005* (2013.01); *Y02T 10/92* (2013.01)

(58) Field of Classification Search
CPC ............ B60L 11/1809; B60L 11/1861; B60L 224/345; H02J 7/1446; H02J 2007/005; B60W 20/00
USPC ................................. 320/109, 132, 134, 150
See application file for complete search history.

(56) References Cited

U.S. PATENT DOCUMENTS

| 5,635,820 A * | 6/1997 | Park | H02J 7/008 320/148 |
|---|---|---|---|
| 6,624,615 B1 * | 9/2003 | Park | B60L 3/0046 320/150 |
| 6,841,972 B2 * | 1/2005 | Koo | B60K 6/46 320/132 |
| 7,250,741 B2 * | 7/2007 | Koo | G01R 31/3624 320/132 |
| 7,489,108 B2 * | 2/2009 | Matsumoto | H02J 7/0029 320/132 |
| 8,098,050 B2 * | 1/2012 | Takahashi | B60K 6/445 320/150 |
| 9,014,894 B2 * | 4/2015 | Park | B60W 20/10 180/65.265 |

(Continued)

FOREIGN PATENT DOCUMENTS

| JP | 2010-057251 A | 3/2010 |
|---|---|---|
| JP | 2013052802 A | 3/2013 |

(Continued)

*Primary Examiner* — Helen Rossoshek
(74) *Attorney, Agent, or Firm* — Mintz Levin Cohn Ferris Glovsky and Popeo, P.C.; Peter F. Corless (57) ABSTRACT

A method and system for controlling charge and discharge of a battery are provided. The method includes detecting a battery temperature using a temperature sensor and determining, by a controller, a state of charge (SOC) of the battery, a first maximum discharging power value, and a first maximum charging power value that correspond to the battery temperature. The controller selects a lowest SOC from among at least one SOC to use a maximum discharging power equal to the determined first maximum discharging power value and resets the first maximum charging power value to a second maximum charging power value that corresponds to the selected lowest SOC. Further, the controller is configured to perform a charge and a discharge of the battery with the reset second maximum charging power value at the detected battery temperature.

10 Claims, 5 Drawing Sheets

(56) References Cited

U.S. PATENT DOCUMENTS

| | | | | |
|---|---|---|---|---|
| 2006/0152196 A1* | 7/2006 | Matsumoto | H02J 7/0029 | 320/132 |
| 2009/0024338 A1* | 1/2009 | Suzuki | G01R 31/3651 | 702/63 |
| 2009/0099800 A1* | 4/2009 | Ishishita | B60L 3/0046 | 702/63 |
| 2009/0254290 A1* | 10/2009 | Kim | G01R 31/361 | 702/63 |
| 2010/0001692 A1* | 1/2010 | Takahashi | B60K 6/445 | 320/132 |
| 2010/0156352 A1* | 6/2010 | Muta | B60K 6/28 | 320/134 |
| 2010/0185405 A1* | 7/2010 | Aoshima | B60L 3/0046 | 702/63 |
| 2010/0250041 A1* | 9/2010 | Li | B60K 6/48 | 701/22 |
| 2011/0313613 A1* | 12/2011 | Kawahara | H01M 10/441 | 701/34.4 |
| 2012/0112754 A1* | 5/2012 | Kawai | G01R 31/3651 | 324/428 |
| 2012/0122000 A1* | 5/2012 | Lee | B60H 1/2218 | 429/429 |
| 2012/0200257 A1* | 8/2012 | Schwarz | H01M 10/42 | 320/109 |
| 2013/0096749 A1* | 4/2013 | Hussain | B60K 6/46 | 701/22 |
| 2013/0096763 A1* | 4/2013 | Izumi | B60R 16/03 | 701/22 |
| 2013/0307329 A1* | 11/2013 | Ito | B60K 6/445 | 307/10.1 |
| 2013/0325230 A1* | 12/2013 | Kim | B60W 10/08 | 701/22 |
| 2013/0325231 A1* | 12/2013 | Park | B60W 20/10 | 701/22 |
| 2014/0097676 A1* | 4/2014 | Kusumi | H02J 7/045 | 307/10.1 |
| 2014/0159670 A1* | 6/2014 | Lee | B60L 3/0007 | 320/134 |
| 2014/0163803 A1* | 6/2014 | Kamatani | B60K 6/445 | 701/22 |

FOREIGN PATENT DOCUMENTS

| | | |
|---|---|---|
| KR | 10-2004-0005117 A | 1/2004 |
| KR | 10-2007-0064402 A | 6/2007 |
| KR | 10-0821776 | 4/2008 |
| KR | 10-2012-0060631 | 6/2012 |
| KR | 10-2013-0023548 | 3/2013 |
| KR | 10-2013-0053064 | 5/2013 |
| KR | 10-2013-0096312 A | 8/2013 |

* cited by examiner

FIG. 1

RELATED ART

| SOC\Temp. | | | | | 40 | 45 | 50 | 55 | 60 | 65 | | | |
|---|---|---|---|---|---|---|---|---|---|---|---|---|---|
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| 25 | -- | -- | -- | -- | 40.4 | 43.2 | 45.6 | (47.0) | (47.0) | 47.0 | -- | -- | -- |
| 30 | -- | -- | -- | -- | 44.7 | 47.0 | 47.0 | (47.0) | 47.0 | 47.0 | -- | -- | -- |
| 35 | -- | -- | -- | -- | (47.0) | 47.0 | 47.0 | 47.0 | 47.0 | 47.0 | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |
| -- | -- | -- | -- | -- | -- | -- | -- | -- | -- | -- | -- | -- | -- |

| SOC Temp. | SOC | | | | | | | | | | | |
|---|---|---|---|---|---|---|---|---|---|---|---|---|
| | -- | -- | -- | -- | -- | -- | 45 | 50 | 55 | 60 | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| 25 | -- | -- | -- | -- | -- | -- | 39.87 | 38.15 | 36.41 | 35.28 | 33.95 | -- | -- |
| 30 | -- | -- | -- | -- | -- | -- | 44.28 | 42.56 | 40.82 | 39.70 | 38.56 | -- | -- |
| 35 | -- | -- | -- | -- | -- | -- | 44.50 | 44.50 | 44.50 | 44.33 | 43.25 | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |
| -- | -- | -- | -- | -- | -- | -- | -- | -- | -- | -- | -- | -- |

164

METHOD AND SYSTEM FOR CONTROLLING CHARGE AND DISCHARGE OF BATTERY

CROSS-REFERENCE TO RELATED APPLICATION

This application claims priority to and the benefit of Korean Patent Application No. 10-2013-0154962 filed in the Korean Intellectual Property Office on Dec. 12, 2013, the entire contents of which are incorporated herein by reference.

BACKGROUND (a) Technical Field

The present disclosure relates to a method and system for controlling charge and discharge of a battery. More particularly, the present disclosure relates to a method and system for controlling charge and discharge of a battery that increase battery charging power and enhance fuel efficiency by adjusting charging power of the battery associated with fuel efficiency of a hybrid vehicle and controlling the charging and discharging of the battery based on the adjusted charging power.

(b) Description of the Related Art

Figure 1:
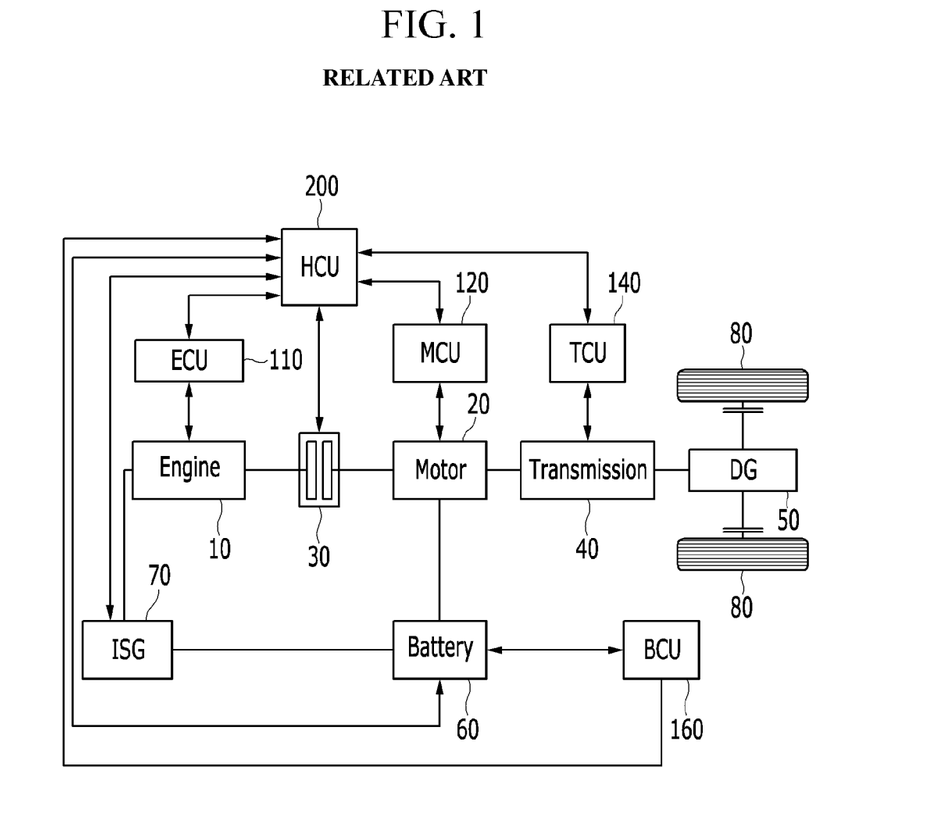
FIG. 1 is an exemplary block diagram illustrating a constitution of a typical hybrid vehicle according to the related art.

Hybrid vehicles operate through the use of power from an internal combustion engine and power from a battery. In particular, hybrid vehicles are designed to efficiently combine and use power of the internal combustion engine and the motor. For example, as illustrated in FIG. 1, a hybrid vehicle includes: an engine 10; a motor 20; an engine clutch 30 configured to control power connection between the engine 10 and the motor 20; a transmission 40; a differential gear unit 50; a battery 60; an integrated starter-generator (ISG) 70 configured to start the engine 10 or generate electric power by output of the engine 10; and a plurality of wheels 80. Although the integrated starter-generator 70 operates as a starter motor or a generator, since the integrated starter-generator 70 is associated with an engine start in the present disclosure, the integrated starter-generator 70 will be regarded as a starter motor in the description.

As further shown, the hybrid vehicle includes: a hybrid control unit (HCU) 200 configured to operate the hybrid vehicle; an engine control unit (ECU) 110 configured to operate the engine 10; a motor control unit (MCU) 120 configured to operate the motor 20; a transmission control unit (TCU) 140 configured to operate the transmission 40; and a battery control unit (BCU) 160 configured to manage and operate the battery 60. The BCU 160 may also be referred to as a battery management system (BMS). The ISG 70 may also be referred to as a starting and generating motor or a hybrid starter-generator (HSG).

The hybrid electric vehicle may be driven in a driving mode, such as an electric vehicle (EV) mode, which is a mode of a true electric vehicle using power of the motor 20; a hybrid electric vehicle (HEV) mode using torque of the motor 20 as auxiliary power while using torque of the engine 10 as main power; and a regenerative braking (RB) mode collecting braking and inertia energy through power generation of the motor 20 to charge the battery 60 during braking or driving using the inertia of the vehicle. In particular, the hybrid vehicle controls and/or manages the charge and discharge of the battery.

The corresponding exemplary embodiment of the related art discloses features of enhancing fuel efficiency by variably enlarging a reference region in which charge and discharge of a battery is performed during a cruise control state. Another exemplary embodiment of the related art discloses features of managing a battery for a hybrid vehicle based on a road state, for example, differently setting a charge range to determine charging/discharging according to driving on a flat road, an up-slope road, and a down-slope road.

However, the described exemplary embodiments of the related art have the following drawbacks and problems.

1. The described related arts are not methods associated with a charge power to substantially influence improvement of fuel efficiency, but are methods only limiting the number of battery charges and discharges by variably controlling a range of a state of charge (SOC) of a battery.

2. The described related arts are only applied to methods related to a cruise control state or a road state (e.g., a flat road, an up-slope road, a down-slope road, etc.).

3. The described related arts need a device to determine a running state and a road state.

4. The described related arts need a complicated logic to process substantial amounts of data received from associated controllers.

The above information disclosed in this section is merely for enhancement of understanding of the general background of the disclosure and therefore it may contain information that does not form the prior art that is already known in this country to a person of ordinary skill in the art.

SUMMARY

The present disclosure provides a method and system for controlling charge and discharge of a battery having advantages of increasing battery charging power and enhancing fuel efficiency by adjusting charging power of the battery associated with fuel efficiency of a hybrid vehicle and controlling the charging and discharging of the battery based on the adjusted charging power.

An exemplary embodiment of the present disclosure provides a method of controlling charge and discharge of a battery which may include: detecting a battery temperature; determining a state of charge (SOC) of the battery, a first maximum discharging power value, and a first maximum charging power value that correspond to the battery temperature; selecting a lowest SOC from among at least one SOC to use a maximum discharging power equal to the determined first maximum discharging power value; resetting the first maximum charging power value to a second maximum charging power value that corresponds to the selected lowest SOC; and performing charge and discharge of the battery with the reset second maximum charging power value at the detected battery temperature.

The SOC of the battery, the first maximum discharging power value, and the first maximum charging power value that correspond to the battery temperature may be determined based on a discharging power map and a charging power map included in a battery management system (BMS). The second maximum charging power value may be greater than the first maximum charging power value. An SOC that corresponds to the first maximum charging power value may be greater than an SOC that corresponds to the second maximum charging power value.

Another exemplary embodiment of the present disclosure provides a system for controlling charge and discharge of a battery for a hybrid vehicle which may include: a battery management system (BMS) configured to operate and manage the battery; a temperature sensor configured to detect a temperature of the battery; a controller configured to adjust a charge and a discharge of the battery based on the detected battery temperature and information data included in the BMS. The controller may be operated by a program, and the program may include a series of commands for executing a method of controlling charge and discharge of a battery for a hybrid vehicle.

The method may include: detecting the battery temperature; determining a state of charge (SOC) of the battery, a first maximum discharging power value, and a first maximum charging power value that correspond to the battery temperature; selecting a lowest SOC from among at least one SOC to use a maximum discharging power equal to the determined first maximum discharging power value; resetting the first maximum charging power value to a second maximum charging power value that corresponds to the selected lowest SOC; and performing a charge and a discharge of the battery with the reset second maximum charging power value at the detected battery temperature.

The BMS may include a discharging power map and a charging power map to adjust the change and discharge of the battery. The controller may be configured to use data included in the discharging power map and the charging power map to determine the SOC of the battery, the first maximum discharging power value, and the first maximum charging power value that correspond to the battery temperature.

According to another exemplary embodiment of the present disclosure, battery charging power may be increased and fuel efficiency may be enhanced by adjusting charging power of the battery associated with fuel efficiency of a hybrid vehicle and controlling the charging and discharging of the battery based on the adjusted charging power. In addition, battery charging power may be increased and fuel efficiency may be enhanced through active control of enhancing substantial charging power of the battery, rather than passive control of the related art. Further, battery charging power may be increased and fuel efficiency may be enhanced regardless of a slope-road state, a driving state, an engine on/off state, etc.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure. Unless explicitly described to the contrary, the word "comprise" and variations such as "comprises" or "comprising" will be understood to imply the inclusion of stated elements but not the exclusion of any other elements. Like reference numerals designate like elements throughout the specification.

Figure 2:
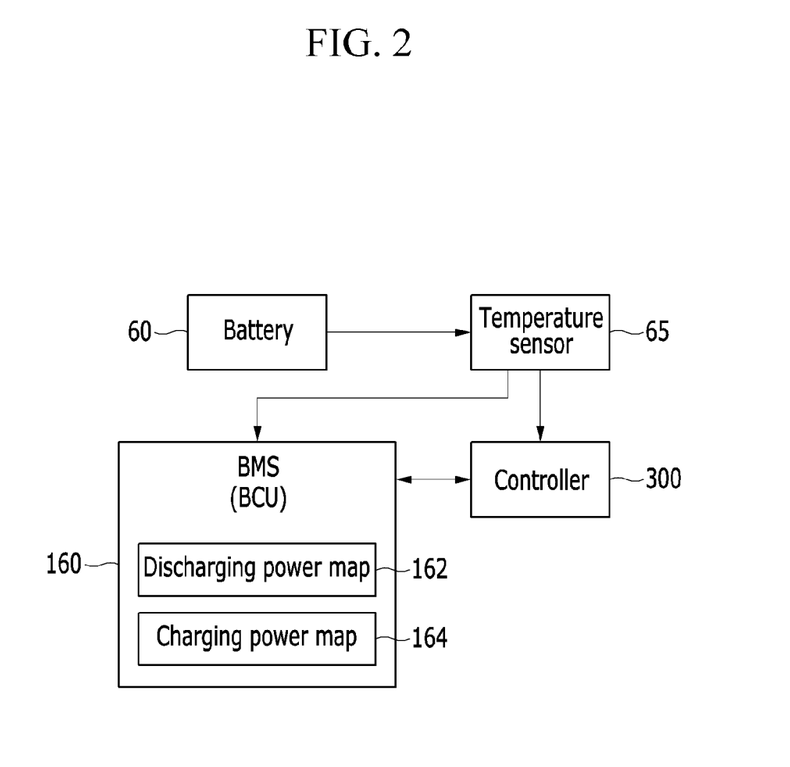
FIG. 2 is an exemplary block diagram illustrating a system for controlling charge and discharge of a battery for a hybrid vehicle according to an exemplary embodiment of the present disclosure.

FIG. 2 is an exemplary block diagram illustrating a system for controlling charge and discharge of a battery for a hybrid vehicle according to an exemplary embodiment of the present disclosure. The system according to an exemplary embodiment of the present disclosure is one that may change a logic extracting output power value according to an SOC of a battery to increase charging power.

The system may include a battery management system (BMS) 160 configured to operate and manage a battery 60, a temperature sensor 65 configured to detect temperature of the battery 60, and a controller 300 configured to adjust a charge and a discharge of the battery 60 based on the detected battery temperature and information data included in the BMS 160. Since the battery 60, the temperature sensor 65, and the BMS 160 may be disposed within the hybrid vehicle and are apparent to those skilled in the art, a detailed description thereof will be omitted.

Figure 4:
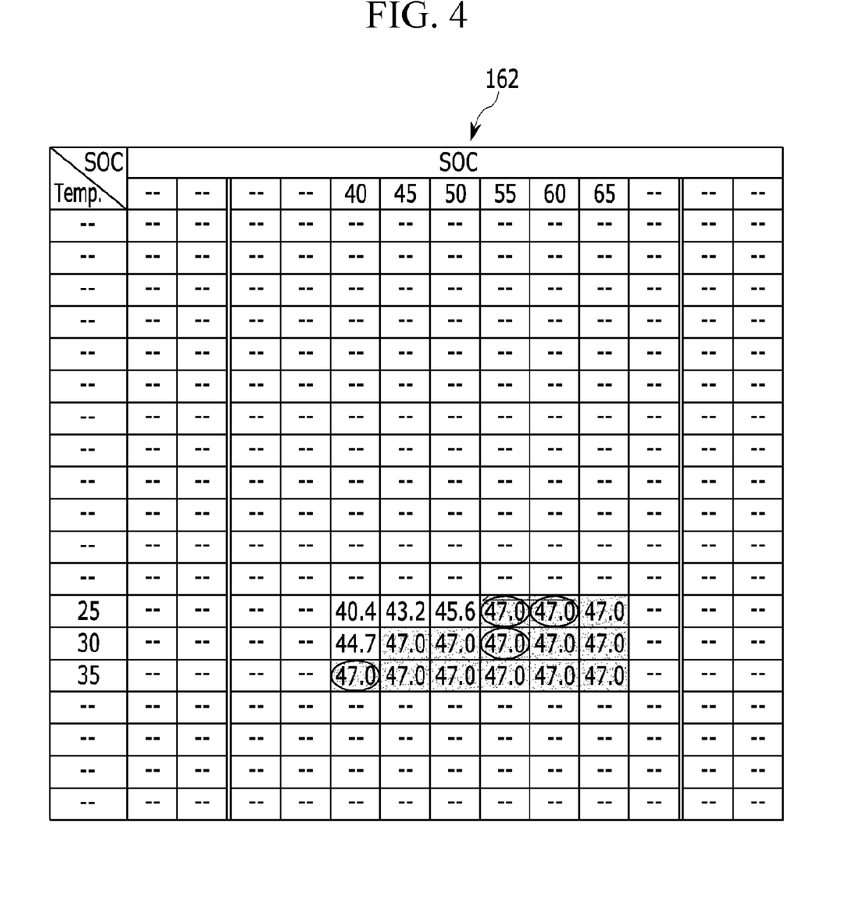
FIG. 4 is an exemplary table of a discharging power map according to an exemplary embodiment of the present disclosure.
Figure 5:
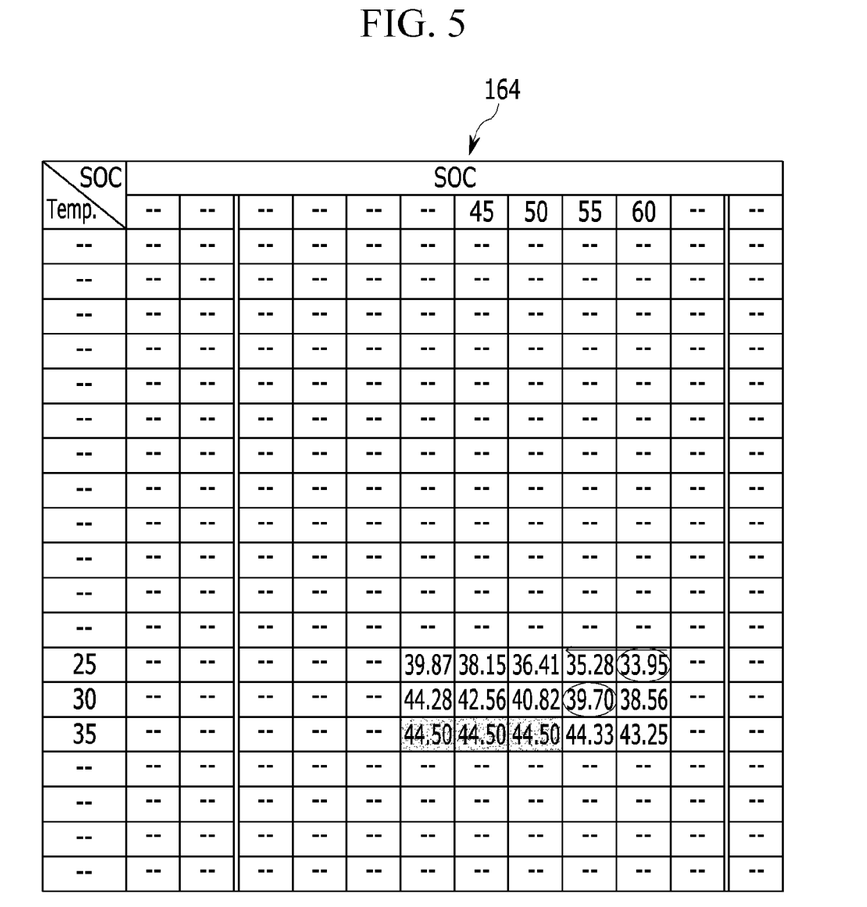
FIG. 5 is an exemplary table of a charging power map according to an exemplary embodiment of the present disclosure.

Nevertheless, the BMS 160 may include a discharging power map 162 and a charging power map 164 to adjust the charge and discharge of the battery 60 as shown in FIG. 4 and FIG. 5. The controller 300 may include one or more processors or microprocessors and/or hardware operated by a program including a series of commands for executing a method of controlling a charge and discharge of a battery for a hybrid vehicle according to an exemplary embodiment of the present disclosure which will be described below. Additionally, the controller 300 may include the BMS 160, or may be included within the BMS 160. The controller 300 may use data included in the discharging power map 162 and the charging power map 164 for charging and discharging operation.

Figure 3:
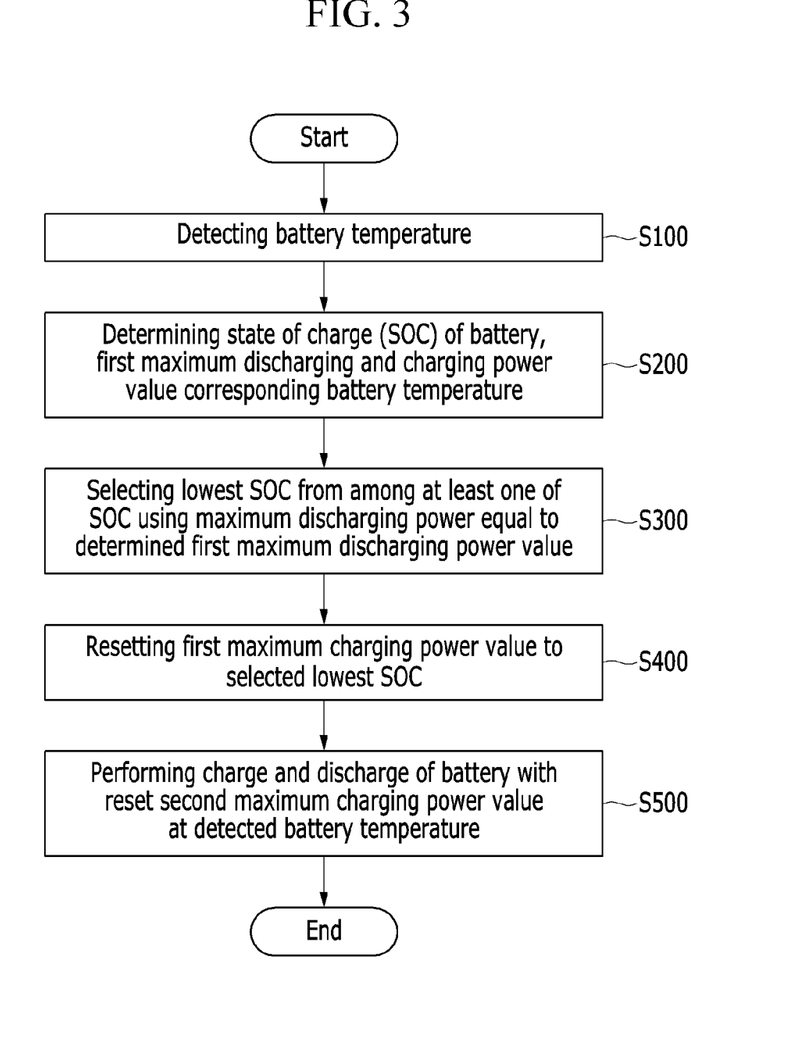
FIG. 3 is an exemplary flowchart illustrating a method of controlling charge and discharge of a battery for a hybrid vehicle according to an exemplary embodiment of the present disclosure.

Hereinafter, a method of controlling charge and discharge of the battery for the hybrid vehicle according to an exemplary embodiment of the present disclosure will be described in detail with reference to the accompanying drawings. FIG. 3 is an exemplary flowchart illustrating a method of controlling charge and discharge of a battery for a hybrid vehicle according to an exemplary embodiment of the present disclosure.

As shown in FIG. 3, the controller 300 may be configured to detect the temperature of the battery 60 via the temperature sensor 65 at step S100. When the controller 300 detects the battery temperature using the temperature sensor 60, the controller 300 may be configured to determine whether a state of charge (SOC) of the battery, a first maximum discharging power value, and a first maximum charging power value that correspond to the battery temperature are included in the discharging power map 162 and the charging power map 164 of the BMS 160 at step S200. Further, determining a discharging power value and charging power of the battery 60 for the hybrid vehicle using the discharging power map 162 (as shown in FIG. 4) and the charging power map 164 (as shown in FIG. 5) is generally well known to those skilled in the art, and thus a further description thereof will be omitted.

After performing step S200, the controller 300 may be configured to select a lowest SOC from among at least one SOC to use a maximum discharging power value about equal to the determined first maximum discharging power value at step S300, and may be configured to reset the first maximum charging power value to a second maximum charging power value that corresponds to the selected lowest SOC at step S400.

When the controller 300 resets the first maximum charging power value to the second maximum charging power value that corresponds to the selected lowest SOC at step S400, the controller 300 may be configured to perform a charge and discharge of the battery 60 with the reset second maximum charging power value at the detected battery temperature at step S500. For example, a maximum charging power value of a battery for a typical hybrid vehicle is generally about 44.5 kW, a maximum discharging power value is generally about 47 kW, and the charging and discharging power values of the battery 60 may be operated at less than the maximum charging and discharging power value based on the battery temperature and the SOC.

In FIG. 4 and FIG. 5, when the battery temperature is about 30° C. and the SOC is about 55, the charging power value may be about 39.7 kW and the discharging power value may be about 47 kW. A main feature of the exemplary embodiment of the present disclosure is that the controller 300 may be configured to downward select (e.g., decreasingly select) an SOC within an SOC region to use an equal maximum discharging power value.

In FIG. 4, the discharging power map 162 indicates that the controller may use discharging power values that correspond to an SOC that is greater than an SOC that corresponds to an actual temperature (e.g., the battery temperature). For example, an SOC region that may use a maximum discharging power value of about 47 kW at about 25° C. is greater than an SOC of about 55. As another example, an SOC region that may use a maximum discharging power value of about 47 kW at about 35° C. is greater than an SOC of about 40. In other words, a logic of the present disclosure is that when an actual SOC is about equal to and greater than 55 at 25° C., the controller 300 may be configured to determine an SOC to be about 55, and when an actual SOC is about equal to and greater than 40 at 35° C., the controller 300 may be configured to determine an SOC to be about 40. Additionally, when an actual SOC is about 60 at about 25° C., a maximum discharging power value may be about 47 kW, and a maximum charging power value may be about 33.95 kW. In this situation, the controller 300 may be configured to reset the actual SOC of 60 to a lowest SOC of 55 to allow the maximum discharging power value of about 47 kW, and then the controller 300 may be configured to increasingly reset (e.g., upward select) the charging power value to about 35.28 kW while maintaining the discharging power value of about 47 kW. As another exemplary embodiment, referring FIG. 4 and FIG. 5, when a battery temperature is at about 30° C. and an SOC is about 55, the controller 300 may be configured to decreasingly reset the SOC of 55 to a new SOC of about 45, so that the controller 300 may be configured to increase the charging power value from about 39.7 kW to about 42.56 kW while maintaining the discharging power value of about 47 kW.

The exemplary embodiment of the present disclosure is based on the charging/discharging power characteristic. In other words, when an SOC is greater than a predetermined SOC at a given temperature, discharging power may be greater than a power that corresponds to the predetermined SOC, and when the SOC is less than the predetermined SOC at the given temperature, charging power may be greater than the power that corresponds to the predetermined SOC. In other words, referring to FIG. 4 and FIG. 5, when an SOC is 55 and a discharging power is about 40 kW, the discharging power may be greater than about 40 kW in an SOC region over a SOC of 55, and when an SOC is 55 and a charging power is about 30 kW, the charging power may be greater than about 40 kW in an SOC region under the SOC of 55. Accordingly, when an SOC is a substantially high SOC such that a discharging power is sufficient and a charging power is substantially short, the controller may be configured to increase the charging power while maintaining the discharging power.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the accompanying claims.

DESCRIPTION OF REFERENCE NUMERALS

60: Battery
65: Temperature Sensor
160: Battery Management System (BMS)

162: Discharging Power Map
164: Charging Power Map
300: Controller

What is claimed is:

1. A method of controlling charge and discharge of a battery for a vehicle, comprising:
   detecting, by a controller, a battery temperature using a temperature sensor;
   determining, by the controller, a state of charge (SOC) of the battery, a first maximum discharging power value, and a first maximum charging power value that correspond to the battery temperature;
   selecting, by the controller, a lowest SOC from among at least one SOC to use a maximum discharging power equal to the determined first maximum discharging power value;
   resetting, by the controller, the first maximum charging power value to a second maximum charging power value that corresponds to the selected lowest SOC and maintaining the first maximum discharging power value that corresponds to the selected lowest SOC; and
   performing, by the controller, a charge and a discharge of the battery with the reset second maximum charging power value at the detected battery temperature and the maintained first maximum discharging power value at the detected battery temperature.

2. The method of claim 1, wherein the SOC of the battery, the first maximum discharging power value, and the first maximum charging power value that correspond to the battery temperature are determined, by the controller, using a discharging power map and a charging power map included in a battery management system (BMS).

3. The method of claim 1, wherein the second maximum charging power value is greater than the first maximum charging power value.

4. The method of claim 1, wherein an SOC that corresponds to the first maximum charging power value is greater than an SOC that corresponds to the second maximum charging power value.

5. A system for controlling charge and discharge of a battery for a vehicle, comprising:
   a battery management system (BMS) configured to operate and manage the battery;
   a temperature sensor configured to detect a temperature of the battery;
   a controller configured to:
      detect the battery temperature using the temperature sensor;
      determine a state of charge (SOC) of the battery, a first maximum discharging power value, and a first maximum charging power value that correspond to the battery temperature;
      select a lowest SOC from among at least one SOC to use a maximum discharging power equal to the determined first maximum discharging power value;
      reset the first maximum charging power value to a second maximum charging power value that corresponds to the selected lowest SOC and maintain the first maximum discharging power value that corresponds to the selected lowest SOC; and
      perform a charge and a discharge of the battery with the reset second maximum charging power value at the detected battery temperature and the maintained first maximum discharging power value at the detected battery temperature and based on information data included in the BMS.

6. The system of claim 5, wherein the BMS includes a discharging power map and a charging power map to adjust the charge and the discharge of the battery.

7. The system of claim 6, wherein the controller is configured to use data included in the discharging power map and the charging power map to determine the SOC of the battery, the first maximum discharging power value, and the first maximum charging power value that correspond to the battery temperature.

8. A non-transitory computer readable medium containing program instructions executed by a controller, the computer readable medium comprising:
   program instructions that control a battery management system (BMS) to operate and manage the battery;
   program instructions that control a temperature sensor to detect a temperature of the battery;
   program instructions that detect the battery temperature using the temperature sensor;
   program instructions that determine a state of charge (SOC) of the battery, a first maximum discharging power value, and a first maximum charging power value that correspond to the battery temperature;
   program instructions that select a lowest SOC from among at least one SOC to use a maximum discharging power equal to the determined first maximum discharging power value;
   program instructions that reset the first maximum charging power value to a second maximum charging power value that corresponds to the selected lowest SOC and maintain the first maximum discharging power value that corresponds to the selected lowest SOC; and
   program instructions that perform a charge and a discharge of the battery with the reset second maximum charging power value at the detected battery temperature and the maintained first maximum discharging power value at the detected battery temperature and based on information data included in the BMS.

9. The non-transitory computer readable medium of claim 8, wherein the BMS includes a discharging power map and a charging power map to adjust the charge and the discharge of the battery.

10. The non-transitory computer readable medium of claim 9, further comprising:
   program instructions that use data included in the discharging power map and the charging power map to determine the SOC of the battery, the first maximum discharging power value, and the first maximum charging power value that correspond to the battery temperature.

* * * * *